US010131831B2

(12) United States Patent
Rimassa et al.

(10) Patent No.: US 10,131,831 B2
(45) Date of Patent: Nov. 20, 2018

(54) PROCESS FOR ACIDIZING USING RETARDED ACID FORMULATIONS

(71) Applicants: BASF SE, Ludwigshafen (DE); BASF Corporation, Florham Park, NJ (US)

(72) Inventors: Shawn Rimassa, Katy, TX (US); Walter Bertkau, Ludwigshafen (DE); Joseph Borst, Plymouth, MI (US)

(73) Assignees: BASF SE (DE); BASF Corporation, Florham Park, NJ (US)

( * ) Notice: Subject to any disclaimer, the term of this patent is extended or adjusted under 35 U.S.C. 154(b) by 0 days.

(21) Appl. No.: 15/303,042

(22) PCT Filed: Mar. 23, 2015

(86) PCT No.: PCT/EP2015/056089
§ 371 (c)(1),
(2) Date: Oct. 10, 2016

(87) PCT Pub. No.: WO2015/154977
PCT Pub. Date: Oct. 15, 2015

(65) Prior Publication Data
US 2017/0037304 A1 Feb. 9, 2017

Related U.S. Application Data

(60) Provisional application No. 61/978,212, filed on Apr. 11, 2014.

(51) Int. Cl.
*E21B 43/26* (2006.01)
*C09K 8/74* (2006.01)
*C09K 8/60* (2006.01)
*E21B 43/25* (2006.01)

(52) U.S. Cl.
CPC ............... *C09K 8/74* (2013.01); *C09K 8/602* (2013.01); *E21B 43/25* (2013.01); *C09K 2208/30* (2013.01); *E21B 43/26* (2013.01)

(58) Field of Classification Search
CPC ...... C09K 8/74; C09K 8/602; C09K 2208/30; E21B 43/25; E21B 43/26
USPC ........................................ 166/307
See application file for complete search history.

(56) References Cited

U.S. PATENT DOCUMENTS

| | | |
|---|---|---|
| 3,319,714 A | 5/1967 | Knox |
| 3,917,536 A | 11/1975 | Crowe |
| 3,962,101 A | 6/1976 | Crowe |
| 4,140,640 A | 2/1979 | Scherubel |
| 5,355,958 A | 10/1994 | Pauls et al. |
| 7,638,469 B2 | 12/2009 | Heidenfelder et al. |
| 8,551,926 B2 | 10/2013 | Huang et al. |
| 8,648,026 B2 | 2/2014 | Borst et al. |
| 2004/0009880 A1* | 1/2004 | Fu .............................. C09K 8/68 507/200 |
| 2005/0016731 A1* | 1/2005 | Rae .......................... C09K 8/72 166/307 |
| 2005/0137095 A1 | 6/2005 | Cawiezel et al. |
| 2007/0238624 A1 | 10/2007 | Li et al. |
| 2012/0222863 A1 | 9/2012 | Bertkau et al. |
| 2012/0260938 A1 | 10/2012 | Zack et al. |
| 2013/0126176 A1 | 5/2013 | Al-Mutairi et al. |
| 2013/0137622 A1 | 5/2013 | Borst et al. |
| 2013/0189842 A1 | 7/2013 | Schmitt et al. |
| 2013/0310285 A1 | 11/2013 | Fedorov et al. |
| 2015/0107832 A1 | 4/2015 | DeWolf et al. |
| 2015/0175872 A1 | 6/2015 | Bertkau et al. |
| 2015/0353815 A1 | 12/2015 | Kurkal-Siebert et al. |
| 2015/0376726 A1 | 12/2015 | Bertkau et al. |

FOREIGN PATENT DOCUMENTS

| | | |
|---|---|---|
| WO | WO-2012171858 A1 | 12/2012 |
| WO | WO-2013149923 A1 | 10/2013 |
| WO | WO-2013189842 A1 | 12/2013 |
| WO | WO-2014205311 A1 | 12/2014 |

OTHER PUBLICATIONS

International Preliminary Examination Report with Annexes (in Englsih) for PCT/EP2015/056089 dated Apr. 5, 2016.
International Search Report for PCT/EP2015/056089 dated Jun. 1, 2015.
U.S. Appl. No. 15/123,498.
U.S. Appl. No. 15/123,489.

* cited by examiner

*Primary Examiner* — Silvana C Runyan
(74) *Attorney, Agent, or Firm* — Drinker Biddle & Reath LLP

(57) ABSTRACT

Method of increasing the permeability in subterranean formations comprising rock that is soluble by acid, in particular carbonatic formations, using a formulation comprising at least an acid and a retarding surfactant which is an amphoteric surfactant. Preferably, the acid comprises methanesulfonic acid.

20 Claims, No Drawings

PROCESS FOR ACIDIZING USING RETARDED ACID FORMULATIONS

CROSS-REFERENCE TO RELATED APPLICATIONS

This application is a national stage application (under 35 U.S.C. § 371) of PCT/EP2015/056089, filed Mar. 23, 2015, which claims benefit of U.S. Application No. 61/978,212, filed Apr. 11, 2014, both of which are incorporated herein by reference in their entirety.

The present invention relates to a method of increasing the permeability in subterranean formations comprising rock that is soluble by acid, in particular carbonatic formations, using a formulation comprising at least an acid and a retarding surfactant which is selected from the group of amphoteric surfactants, betaines, and N-oxides. Preferably, the acid comprises methanesulfonic acid.

BACKGROUND OF THE INVENTION

In mineral oil or natural gas recovery, mineral oil- and/or natural gas-carrying rock formations are drilled. Typical rock formations comprise sandstone formations and/or carbonate formations. In the case of sandstone formations, the quartz particles are caked together by other materials, including carbonates. Of course, carbonatic formations, too, may have a certain quartz content or silicate content.

Owing to the difference between the pressure in the formation and the pressure in the well, the mineral oil or natural gas flows through fine channels, pores or the like in the formation to the well and is conveyed from there to the surface. The pressure in the formation may be of natural origin or may be artificially maintained, for example, by forcing in water, steam or other liquid or gaseous media through an injection well into the formation.

In order to ensure an economical production rate for mineral oil and natural gas, the permeability of the rock formation must reach a certain degree. Frequently, however, the permeability of the rock formation is too low. On the one hand, the natural permeability may already be too low; on the other hand, however, pores which are sufficiently large per se may become blocked with particles and/or precipitates, for example $CaCO_3$ particles or precipitates, in the course of time. As a result, the permeability of the formation is reduced thus reducing the productivity of oil or gas production.

It is known in the art to increase the permeability of subterranean formations by an acid treatment (also referred to as "acidizing treatment" or "acidizing"). By such an acid treatment new channels or pores can also be created in the formation and furthermore precipitates and/or particles plugging the formation may be dissolved. Further details in this context are described, for example, in Ullmann's Encyclopedia of Industrial Chemistry, 6th Edt., 2000 Electronic Release, "Resources of Oil and Gas, 3.4.2. General Production Engineering".

For example, aqueous solutions of HF, HCl or organic acids may be used for the acidizing treatment.

U.S. Pat. No. 7,638,469 discloses the use of methanesulfonic acid (MSA) for acidizing of carbonatic formations. MSA is a strong acid but is far less corrosive as compared to HCl. This is an important advantage over HCl because it is not avoidable that the acid comes into contact with metals surfaces when injecting it into the formation through a wellbore. U.S. Pat. No. 7,638,469 also discloses the use of additives in addition to MSA, such as amidosulfonic acid $H_2N-SO_3H$, water soluble corrosion inhibitors such as propargyl alcohol, butynediol or alkoxylated derivatives therefrom, water soluble polymeric corrosion inhibitors, complexing agents such as EDTA, NTA, HEDTA, MGDA, DTPA, polymers for increasing viscosity, surfactants, foamers, foam breakers, enzymes, oxidizing agents, friction reducers, or paraffin controlling agents.

In course of acidizing, typically an aqueous acid solution is injected into the production well. From the production well the acid solution penetrates through the perforation of the casing into the subterranean formation where the acid reacts with the formation and/or impurities therein thereby increasing its permeability.

The acid may be injected at a pressure sufficient to hydraulically disintegrate the formation for creating fissures, pores and channels ("fracture acidizing") or the acid may be injected at a pressure not sufficient to disintegrate the formation ("matrix acidizing"). In the latter case, an increased permeability results only from the action of the acid.

Strong acids such as HCl show a very fast reaction with carbonatic rocks. Such a fast reaction has the disadvantage that the acid cannot penetrate deeply into the formation before the acid becomes spent. So, the acid only reacts rapidly with such zones of the formation very close to the wellbore while zones of the formation more distant from the wellbore are no longer affected by the acid.

It has therefore been suggested to retard the reaction rate between the acid and the formation in order to allow the acid to penetrate also into zones of the formation more distant from the wellbore.

It is known in the art to use acid-in-oil emulsions, such as the acid-in-oil emulsions suggested by U.S. Pat. No. 4,140,640; U.S. Pat. No. 5,355,958; U.S. Pat. No. 8,551,926 B2 or US 2013/0126176 A1.

It is furthermore known in the art to pretreat the formation with a composition which renders to formation oil-wet thus retarding the action of the aqueous acid on the formation.

Finally, it is also known in the art to add a retarding surfactant directly to the aqueous acid solution. U.S. Pat. No. 3,319,714 discloses a method of acidizing a calcareous formation with an acid comprising additionally an anionic surface active agent. Preferred surfactants are sulfonates of the general formula $RSO_3X$, wherein R is a $C_8$ to $C_{28}$ hydrocarbon moiety and X is an alkali metal ion or an ammonium ion. U.S. Pat. No. 3,917,536 and U.S. Pat. No. 3,962,101 disclose an acidizing solution comprising additionally a $C_8$- to $C_{18}$ primary amine.

US 2012/0222863 A1 discloses to use microcapsules filed with alkanesulfonic acids, in particular MSA for acidizing applications in carbonatic rock formations. MSA is released from such microcapsules in the formation with some delay.

It is furthermore known in the art to use alkanesulfonic acids, in particular MSA in methods of dissolving and/or inhibiting the formation of scale on surfaces, such as disclosed by US 2012/0260938 A1, U.S. Pat. No. 8,648,026 B2 and WO 2013/149923 A1. U.S. Pat. No. 8,648,026 B2 discloses a composition for dissolving and/or inhibiting deposition of scale on a surface of a system, such as a heat-exchanger or a cooling tower, comprising an acidic component comprising an alkanesulfonic acid, a wetting agent comprising a surfactant, and a corrosion inhibitor comprising an amphoteric surfactant. In one embodiment, the amphoteric surfactant may be a β-amino or β-imino propionate.

DETAILED DESCRIPTION OF THE INVENTION

It was an object of the present invention to provide an improved method of increasing the permeability of subterranean formations comprising rock that is soluble by acid, in particular carbonatic rock formations.

Correspondingly, a method of increasing the permeability in a subterranean formation comprising rock that is soluble by acid, in particular carbonatic formations, has been found, the method comprising: providing an aqueous formulation comprising at least an acid and at least a surfactant soluble in the aqueous formulation and injecting the aqueous formulation through at least one injection well into the formation, wherein the surfactant is at least one surfactant selected from the group of surfactants (A), (B), and (C) wherein the surfactants are defined as follows:

(A) Amphoteric surfactant having the general formula

wherein
$R^1$ is a group selected from the group of
$R^{1a}$: alkyl and/or alkenyl groups having from 8 to 24 carbon atoms,
$R^{1b}$: a group $R^4CO-$, wherein $R^4$ is an alkyl and/or alkenyl group having from 7 to 15 carbon atoms,
$R^{1c}$: a group $R^4CO-NH-R^5-$, wherein $R^4$ has the meaning as defined above and $R^5$ is an alkylene group having 1 to 4 carbon atoms,
$R^2$ and $R^3$ are selected independently from the group of
ω-carboxyalkyl groups ($R^{2a}$, $R^{3a}$) of the general formula $-(CH_2)_n-COOM$ (II), wherein M is $H^+$ or a cation and n is a number from 1 to 10,
ω-hydroxyalkyl groups ($R^{2b}$, $R^{3b}$) of the general formula $-(CH_2)_n-OH$ (III), wherein n is a number from 1 to 10
groups ($R^{2c}$, $R^{3c}$) of the general formula $-(CH_2CH_2-R^6)_m-R^7-COOM$ (IV), wherein M is $H^+$ or a cation, m is a number from 1 to 10, $R^6$ is selected from $-O-$ and $-NH-$ and $R^7$ is an alkylene group having 1 to 4 carbon atoms, (B) Betains having the general formula

wherein
$R^8$ is a group selected from
$R^{8a}$: alkyl and/or alkenyl groups having from 8 to 24 carbon atoms, and
$R^{8b}$: a group $-R^{11}CO-NH-R^{12}-$, wherein $R^{11}$ is an alkyl and/or alkenyl group having from 7 to 15 carbon atoms and $R^{12}$ is an alkylene group having 1 to 4 carbon atoms,
$R^9$, $R^{10}$ are independently selected from $C_1$- to $C_4$-alkyl groups, and
k is a number from 1 to 10, and (C) N-Oxides having the general formula

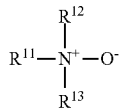

wherein
$R^{11}$ alkyl and/or alkenyl groups having from 8 to 24 carbon atoms, and
$R^{12}$, $R^{13}$ are independently selected from $C_1$- to $C_4$-alkyl groups.

In one embodiment of the invention the surfactants are amphoteric surfactants (A). In a preferred embodiment of the invention, the acid comprises methanesulfonic acid.

Specific details of the invention are as follows:

The method according to the present invention relates to increasing the permeability in subterranean formations comprising rock which is soluble in acid, in particular oil and/or gas bearing formations using acids. The acids dissolve the rock thereby generating new pores, channels and the like in the formation, Such a method is also known as "acidizing".

In one embodiment of the invention the formation is a carbonatic rock formation. The term "carbonatic rock formation" is known in principle to the person skilled in the art. Carbonatic rock formations substantially comprise carbonates, in particular $CaCO_3$ and/or $MgCO_3$, for example in the form of magnesite, dolomite, limestone, chalk or aragonite. Further carbonates, such as, for example, $SrCO_3$ or $BaCO_3$, can of course also be present. The rock formations can of course also comprise impurities or can be mixed with other rock formations, for example silicate formations.

The term "carbonatic rock formation" is also intended to comprise carbonate-containing rock formations in which other minerals form the main constituent but which comprise at least small amounts of carbonates, in particular $CaCO_3$ and/or $MgCO_3$, frequently in amorphous or poorly crystallized forms. Carbonate-containing rock formations comprise, as a rule, at least 1% by weight, preferably at least 2% by weight, particularly preferably at least 5% by weight and very particularly preferably at least 10% by weight of carbonates, based in each case on the sum of all components. Silicate formations in which silicate and/or quartz particles may be caked together by means of carbonate may be mentioned as an example.

For the method according to the present invention an aqueous formulation comprising at least water, at least an acid and at least a surfactant soluble in the aqueous formulation is used. Optionally, the aqueous formulation may comprise further components.

Examples of suitable acids comprise HCl, HF, organic acids, such as, for example, formic acid, acetic acid, p-toluenesulfonic acid amido sulfonic acid or water-soluble alkanesulfonic acids. Alkanesulfonic acids have the general formula $R^8-SO_3H$, where $R^1$ is a straight-chain, branched or cyclic alkyl radical. The person skilled in the art chooses the radical with the proviso that the alkanesulfonic acid should still have sufficient solubility in water. This also depends of course on the concentration intended for the respective application. As a rule, $R^8$ is a straight-chain or branched $C_1$- to $C_6$-alkyl radical, preferably a $C_1$- to $C_4$-alkyl radical and most preferably a methyl group.

Of course also a mixture of two or more acids may be used. Examples of suitable acid mixtures comprise mixtures of methanesulfonic acid and HF, methanesulfonic acid and HCl, formic acid and acetic acid, acetic acid and HCl, formic acid and HCl, and HF and HCl. Mixtures of HF and HCl are also known as mud acid any may be used for example in a weight ratio of 9:1 or 12:3.

The skilled artisan may select suitable acids according to his/her needs, in particular according to the nature of the formation to be acidized. By way of example if the formation comprises silicates and it is desired also to dissolve such silicates HF or acid mixtures comprising HF should be used.

Methanesulfonic acid (abbreviated to MSA, formula: $H_3C$—$SO_3H$) is particularly preferably used in the method according to the invention. Methanesulfonic acid is a very strong acid ($pK_a$: −2) but, in contrast to HCl or formic acid, has only a low vapor pressure. It is therefore very particularly suitable also for use at relatively high temperatures. Methanesulfonic acid can therefore advantageously be used for the treatment of rock formations having a temperature of at least 60° C., in particular from 60 to 250° C.

The concentration of the acids in the aqueous solutions may be chosen by the skilled artisan according to his/her needs. It is self-evident that it depends on the nature of the acid.

By way of example the concentration of methanesulfonic acid may be from 1% to 50% by weight with respect to all components of the aqueous solution, in particular from 5% to 50% by weight, preferably 10% to 30% by weight, and for example 15% to 25% by weight.

The concentration of HCl used may be from 2% to 28% by weight in particular 2 to 20% by weight, preferably 5% to 15% by weight.

Besides water and an acid, the aqueous formulation used may comprise small amounts of organic, water-miscible solvents. These may be, in particular, alcohols, for example methanol, ethanol or propanol, however as a rule, the proportion of water is at least 80% by weight, preferably 90% by weight and particularly preferably at least 95% by weight, based in each case on the total amount of all solvents used.

The aqueous formulation used for the method of the invention furthermore comprises at least one surfactant selected from the group of surfactants (A), (B), and (C) soluble in the aqueous formulation. The term "soluble in the aqueous formulation" refers to the concentration of the surfactant on the aqueous acid formulation chosen by the skilled artisan. So, it is not necessary—although preferred—that the surfactants are soluble in the aqueous formulation at any concentration but the minimum requirement is that they are soluble at the concentration of use.

The surfactants have a retarding effect on the reaction between the acid and the formation soluble in acid, in particular the carbonatic rock formation, i.e. the surfactants lower the reaction rate of the reaction between the acid and the carbonatic rock formation thereby increasing the time until the acid injected into the formation is spent. So, the acid injected can penetrate deeper into the formation before it is spent and therefore also zones of the formation more distant from the well are affected by the acid.

The surfactants (A) used according to the present application are amphoteric surfactants having the general formula $$R^1\text{—}N(R^2)(R^3) \quad (I).$$

In formula (I) $R^1$ is a group selected from the group of
$R^{1a}$: an alkyl and/or alkenyl group having from 8 to 24, preferably 8 to 16, more preferably from 10 to 14 carbon atoms
$R^{1b}$: a group $R^4CO$—, wherein $R^4$ is a preferably linear alkyl and/or alkenyl group having from 7 to 15, preferably from 9 to 13 carbon atoms, and
$R^{1c}$: a group $R^4CO$—NH—$R^5$—, wherein $R^4$ has the meaning as defined above and $R^5$ is an alkylene group having 1 to 4, preferably 2 carbon atoms, preferably a 1,2 ethylene group —$CH_2$—$CH_2$—.

$R^2$ and $R^3$ are selected independently from the group of
$R^{2a}$, $R^{3a}$: ω-carboxyalkyl groups of the general formula —$(CH_2)_n$—COOM (II), wherein M is H or a cation, preferably $Na^+$ od $K^+$, and n is a number from 1 to 10, preferably 1 to 4, and most preferably 2,
$R^{2b}$, $R^{3b}$: ω-hydroxyalkyl groups of the general formula —$(CH_2)_n$—OH (III), n is a number from 1 to 10, preferably 1 to 4, and most preferably 2,
$R^{2c}$, $R^{3c}$: groups of the general formula —($CH_2CH_2$—$R^6)_m$—$R^7$—COOM (IV), wherein M is H+ or a cation, preferably $Na^+$ od $K^+$, m is a number from 1 to 10, preferably 1 to 4, most preferably 1, $R^6$ is selected from —O— and —NH— and $R^7$ is an alkylene group having 1 to 4, preferably 1 or 2 carbon atoms, more preferably a methylene group —$CH_2$—.

$R^2$ is selected from $R^{2a}$, $R^{2b}$, and $R^{2c}$ and $R^3$ is selected from $R^{3a}$, $R^{3b}$, and $R^{3c}$ with the proviso that at least one of the groups $R^2$ and $R^3$ comprises a —COOM group.

In one preferred embodiment of the invention the amphoteric surfactants (A) have the general formula $R^{1a}$—$N(R^{2a})(R^{3a})$, i.e. $R^{2a}$—$N$(—$(CH_2)_n$—$COOM)_2$ (Ia). In formula (Ia) preferably n is 2, and $R^{2a}$ is a preferably linear alkyl group having from 10 to 14 carbon atoms. An example for an amphoteric surfactant of formula (Ia) comprises n-$C_{12}H_{25}$—N(—$CH_2CH_2$—$COOM)_2$.

In another embodiment of the invention the amphoteric surfactants (A) have the general formula $R^{1b}$—$N(R^{2b})(R^{3c})$, i.e. $R^4CO$—N(—$(CH_2)_n$—OH)(—($CH_2CH_2$—$R^6)_m$—$R^7$—COOM) (Ib). In formula (Ib) n preferably is 1 to 4, $R^6$ is —NH—, $R^7$ is selected from —$CH_2$— and —$CH_2CH_2$—, and m is 1. An example for an aphoteric surfactant of formula (Ib) comprises $R^4CO$—N(—$CH_2CH_2$—OH)(—$CH_2CH_2$—NH—$CH_2$—COOM).

In another embodiment of the invention the amphoteric surfactants (A) have the general formula $R^{1c}$—$N(R^{2a})(R^{3c})$, i.e. $R^4CO$—NH—$R^5$—N(—$(CH_2)_n$—COOM)-($CH_2CH_2$—$R^6)_m$—$R^7$—COOM) (Ic). In formula (Ic) $R^6$ preferably stands for —$CH_2CH_2$—, n preferably is 1 to 4, $R^6$ is —O—, $R^7$ is selected from —$CH_2$— and —$CH_2CH_2$—, and m is 1. An example for an amphoteric surfactant (A) of formula (Ic) comprises $R^4CO$—NH—$CH_2CH_2$—N(—$CH_2$—COOM)(—$CH_2CH_2$—O—$CH_2$—COOM).

The surfactants (B) used according to the present application are betains having the general formula

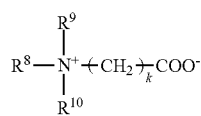

(V)

In formula (V) $R^8$ is a group selected from the group of
$R^{8a}$: alkyl and/or alkenyl groups having from 8 to 24 carbon atoms, preferably 8 to 18 carbon atoms, for example 12 to 14 carbon atoms,
$R^{8b}$: a group —$R^{11}CO$—NH—$R^{12}$—, wherein $R^{11}$ is an alkyl and/or alkenyl group having from 7 to 15 carbon atoms and $R^{12}$ is an alkylene group having 1 to 4 carbon atoms.

The groups $R^9$, $R^{10}$ are independently selected from $C_1$- to $C_a$-alkyl groups, for example methyl, ethyl, or propyl groups. Preferably, $R^9$ and $R^{10}$ are both methyl groups.

Furthermore, in formula (V) k is a number from 1 to 10, preferably 1 to 3. Examples comprise methylene, 1,2-ethylene, and 1,3-propylene groups.

The surfactants (C) used according to the present application are N-oxides having the general formula

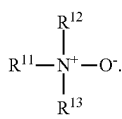

(VI)

In formula (VI) $R^{11}$ is an alkyl and/or alkenyl groups having from 8 to 24 carbon atoms, preferably 8 to 18 carbon atoms, for example 12 to 14 carbon atoms, and $R^{12}$, $R^{13}$ are independently selected from $C_1$- to $C_4$-alkyl groups, for example methyl, ethyl, or propyl groups. Preferably, $R^{12}$ and $R^{13}$ are both methyl groups.

Of course also a mixture of two or more surfactants selected from (A), (B) and (C) may be used.

The concentration of the surfactants (A), (B), (C), and (D) may be chosen by the skilled artisan according to his/her needs. In general, the concentration is from 0.1% to 10% by weight, in particular from 0.1 to 3% by weight with respect to all components of the aqueous formulation. Preferably, the concentration is from 0.2 to 10% by weight, in particular from 0.2% by wt. to 2.5% by weight, more preferably from 0.5% by weight to 1.5% by weight.

In one embodiment of the invention amphoteric surfactants (A) are used,

The formulation can of course also comprise conventional additives and assistants which are typical for an acidizing treatment of oil- or gas-carrying rock formations. Examples of such assistants comprise, for example, polymers for increasing the viscosity, foam formers or foam breakers, oxidizing agents, enzymes, assistants for reducing the friction or for controlling paraffin precipitations and biocides. In addition, complexing agents, such as, nitrilotriacetic acid (NTA), ethylenediaminetetraacetic acid (EDTA), diethylenetriaminepentaacetic acid (DTPA), hydroxyethylethylenediaminetriacetic acid (HEDTA) or methylglycenediacetic acid (MGDA), can preferably be used as assistants. In one embodiment of the invention, the aqueous formulation comprises at least methylglycenediacetic acid (MGDA). The content of additives is chosen by the person skilled in the art according to the desired use.

For carrying out the method according to the invention, the acidic aqueous formulation is forced in a manner known in principle through at least one well at a pressure sufficient to penetrate through the perforation into the subterranean formation. When the acidic aqueous formulation contacts the acid soluble rocks, in particular the carbonatic rocks and/or carbonate-containing impurities in the formation such rocks react with the acid thereby increasing the permeability of the subterranean formation. By way of example, the increased permeability may be caused by the dissolution of carbonatic impurities clogging pores, cavities and the like in the formation, increasing existing channels, pores and the like and/or forming new channels, pores and the like. The increased permeability yields in a higher oil production when resuming the oil production after the acidizing treatment.

The penetration depth of the acidizing treatment may depend on such parameters as the injection rate, time of treatment but also on the nature of the aqueous formulation itself. When the acid injected is spent than it will have no longer an effect on the formation even if the formulation is forced to penetrate further into the formation.

The surfactants selected from the group of surfactants (A), (B), and (C) used according to the present invention retard the reaction between the acid and the carbonates in the formation and thereby increase the time until the acid is spent. Consequently, the acidic aqueous formulation can penetrate deeper into the formation until the acid is spent and also zones of the formation which are more distant from the well are still affected by the acid and the permeability is increased also in such zones of the formation. It goes without saying that such increase in permeability also in more distant regions may be important for a higher oil production.

The acidic aqueous formulation may be injected into a production well or into an injection well. The production well is a well through which mineral oil or natural gas is also withdrawn, The injection well serves for forcing in flooding media for maintaining the pressure in the deposit. A treatment of the injection well reduces pressure drops when the flooding medium is forced in and thus also advantageously contributes to higher productivity.

The acidizing treatment according to the invention can be a so called "matrix acidizing" process. In the case of matrix acidizing the pressure of injection is limited to pressures not sufficient to hydraulically create fissures and/or fractures in the formation.

The acidizing treatment according to the invention may be combined with a fracturing process (the so called "fracture acidizing"). In the case of fracture acidizing the pressure of injection is sufficient to hydraulically create fissures and/or fractures in the formation.

The temperature of the formation may be from 20° C. to 250° C. Methanesulfonic acid can advantageously be used for the treatment of carbonatic rock formations having a temperature of at least 60° c., in particular from 60 to 250° C. In one embodiment the temperature of the rock formation to be treated with methanesulfonic acid is from 100° C. to 220° C., preferably from 120 to 200° C.

The following examples are intended to illustrate the invention in detail:

Materials Used:

| Acids: | |
|---|---|
| MSA (20%) | Solution of 20% by weight of methanesulfonic acid ($H_3C$—$SO_3H$) in water |
| HCl (7%) | Solution of 7% by weight of HCl in water |

| Retarders: | | |
|---|---|---|
| Retarder | Type | |
| No. 1 | (A) | Na—N-lauryl-β-iminodipropionate (Deriphat ® 160 C) |

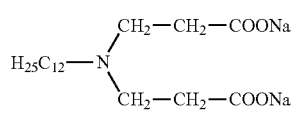

-continued

| Retarders: | | |
|---|---|---|
| Retarder | Type | |
| No. 2 | (A) | Glycine, N-[2-[(2-hydroxyethyl)amino]ethyl]-, N'-coco acyl derivs., monosodium salt (Sodium Cocoamphoacetate) |

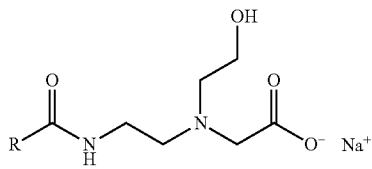

| | | |
|---|---|---|
| No. 3 | (A) | Disodium Cocoamphodiacetate |

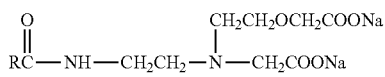

| | | |
|---|---|---|
| No. 4 | (B) | Betaines, C12-14-alkyldimethyl |

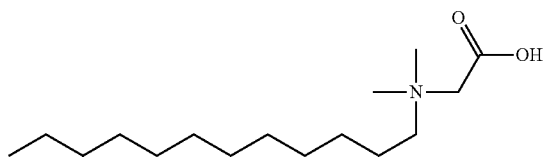

| | | |
|---|---|---|
| No. 5 | (B) | Betaines, C8-18/18:1 amidopropyl dimethyl |

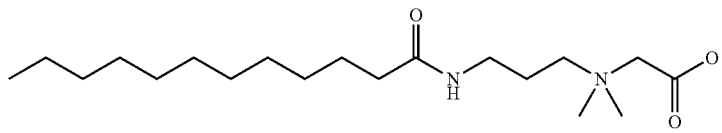

| | | |
|---|---|---|
| No. 6 | (C) | Lauramine oxide |
| No. 7 (comparative) | | Commercially available corrosion inhibitor (Flotek ACl 132) |
| No. 8 (comparative) | | Commercially available corrosion inhibitor (WGK1-22) |
| No. 9 (comparative) | | Potassium Iodide |

Test Method:

For the tests tiles of Carrara marble (7.5 cm×5.0 cm×0.4 cm) were used. The tests were performed at room temperature. The tiles were immersed for 10 s into the acid solution to be tested, removed from the test solution and allowed to react with the acidic film on the tile for 10 min. After the reaction time they were rinsed with demineralized water and dried at 105° C. The procedure of immersion, reaction, rinsing and drying was repeated 5 times. The tiles were weighted before and after each test run to determine the weight loss.

For the tests either MSA (20 wt. % in water) or HCl (7 wt. % in water) (both acids ~2 mol/l) were used and the inhibitors No. 1 to No. 6 or the comparative inhibitors No. 7 to No. 9 added. The amounts of inhibitors used and the results are summarized in tables 1 and 2. The table shows the total loss after 3 resp. 5 runs and the calculated relative loss as %.

TABLE 1

Test of commercial corrosion inhibitors

| Test No. | Acid | Retarder | Initial mass [g] | mass after 5th run [g] | total loss [g] | [%] |
|---|---|---|---|---|---|---|
| C1 | HCl | — | 71.596 | 66.432 | 5.164 | 7.21 |
| C2 | HCl | 1 wt. % No. 7 (comparative) | 67.447 | 62.105 | 5.342 | 7.92 |
| C3 | HCl | 1 wt. % No. 8 (comparative) | 71.866 | 68.452 | 3.414 | 4.75 |
| C4 | HCl | 1 wt. % No. 7 + 0.5 wt. % No. 9 (comparative) | 64.25 | 59.094 | 5.156 | 8.02 |
| C5 | HCl | 1 wt. % No. 8 + 0.5 wt. % No. 9 (comparative) | 69.746 | 65.857 | 3.889 | 5.58 |
| C6 | MSA | — | 67.448 | 63.973 | 3.475 | 5.15 |

TABLE 1-continued

Test of commercial corrosion inhibitors

| Test No. | Acid | Retarder | Initial mass [g] | mass after 5th run [g] | total loss [g] | [%] |
|---|---|---|---|---|---|---|
| C7 | MSA | 1 wt. % No. 7 (comparative) | 73.496 | 68.821 | 4.675 | 6.36 |
| C8 | MSA | 1 wt. % No. 8 (comparative) | 70.269 | 68.008 | 2.261 | 3.22 |
| C9 | MSA | 1 wt. % No. 7 + 0.5 wt. % No. 9 (comparative) | 68.131 | 63.121 | 5.01 | 7.35 |
| C10 | MSA | 1 wt. % No. 8 + 0.5 wt. % No. 9 (comparative) | 68.668 | 65.015 | 3.653 | 5.32 |

TABLE 2

Test of acid retarder No. 1 according to invention

| Test No. | Acid | Retarder No. | type | amount | Initial mass [g] | mass after 3rd run [g] | total loss [g] | [%] |
|---|---|---|---|---|---|---|---|---|
| C11 | HCl | — | — | — | 71.87 | 69.316 | 2.554 | 3.55 |
| C12 | HCl | 7 | — | 1 wt. % | 73.863 | 68.313 | 0.960 | 3.62 |
| 1 | HCl | 1 | (A) | 1 wt. % | 72.055 | 71.07 | 0.985 | 1.37 |
| C13 | MSA | — | — | — | 70.219 | 68.45 | 1.769 | 2.52 |
| C14 | MSA | 7 | — | 1 wt. % | 70.068 | 67.649 | 2.419 | 3.45 |
| 2 | MSA | 1 | (A) | 1 wt. % | 70.341 | 69.276 | 1.065 | 1.51 |

TABLE 3

Test of acid retarders No. 1 to No. 6 according to invention

| Test No. | Acid | Retarder No. | type | amount | Initial mass [g] | mass after 5th run [g] | total loss [g] | [%] |
|---|---|---|---|---|---|---|---|---|
| C15 | HCl | — | — | — | 67.085 | 62.811 | 4.2736 | 6.4 |
| C16 | MSA | — | — | — | 66.000 | 63.995 | 2.0057 | 3.0 |
| 3 | MSA | 1 | (A) | 0.1 wt. % | 67.626 | 65.892 | 1.7335 | 2.6 |
| 4 | MSA | 1 | (A) | 1 wt. % | 71.240 | 70.319 | 0.9215 | 1.3 |
| C17 | MSA | 2 | (A) | 0.1 wt. % | 68.630 | 66.276 | 2.3542 | 3.4 |
| 5 | MSA | 2 | (A) | 1 wt. % | 65.934 | 64.998 | 0.9366 | 1.4 |
| C18 | MSA | 3 | (A) | 0.1 wt. % | 69.917 | 67.275 | 2.6420 | 3.8 |
| 8 | MSA | 3 | (A) | 1 wt. % | 68.275 | 67.203 | 1.0717 | 1.5 |
| 6 | MSA | 4 | (B) | 0.1 wt. % | 67.321 | 65.719 | 1.6014 | 2.4 |
| 7 | MSA | 4 | (B) | 1 wt. % | 71.129 | 70.223 | 0.9055 | 1.3 |
| 8 | MSA | 5 | (B) | 0.1 wt. % | 68.365 | 66.337 | 2.0278 | 3.0 |
| 7 | MSA | 5 | (B) | 1 wt. % | 67.482 | 66.593 | 0.8891 | 1.3 |
| C19 | MSA | 6 | (C) | 0.1 wt. % | 66.060 | 63.816 | 2.2443 | 3.4 |
| 9 | MSA | 6 | (C) | 1 wt. % | 66.072 | 65.199 | 0.8734 | 1.3 |

Comments:

The comparative examples C1 and C6 which were each performed without any inhibitor demonstrate that the reaction rate for MSA is lower than that for HCl, so MSA has advantages for matrix acidizing.

The comparative examples C1 to C10 in table 1 show that the comparative inhibitor No. 7 is neither effective in combination with HCl nor with MSA in retarding the effect of the acid. The comparative inhibitor 8 has a retarding effect but it is not very pronounced. Adding KI to the comparative inhibitor No. 7 or the comparative inhibitor No. 8 increases the reaction rate.

Table 2 shows that inhibitor No. 1 according to the invention very significantly reduces the reaction rate of the dissolution of $CaCO_3$ in MSA as well as in HCl.

Table 3 shows a test of various inhibitors according to the present invention. All inhibitors show a very pronounced reduction of the reaction rate at a concentration of 1 wt. %. The inhibitors No. 1 and No. 4 show slight reduction of the reduction rate already at a concentration of 0.1 wt. % while others show not yet an effect at this concentration.

The invention claimed is:

1. A method of increasing permeability in a subterranean formation comprising carbonatic rock that is soluble by acid, the method comprising:
providing an aqueous formulation comprising at least an acid and at least one surfactant soluble in the aqueous formulation and injecting the aqueous formulation through at least one injection well into the subterranean formation, wherein the at least one surfactant includes an amphoteric surfactant (A) which lowers a reaction rate between the acid and the carbonatic rock formation and the surfactant (A) of formula $$R^1—N(R^2)(R^3) \quad (I)$$

wherein $R^1$ is a group selected from the group consisting of $R^{1a}$, alkyl and/or alkenyl groups having from 8 to 24 carbon atoms;

$R^{1b}$, a group R4CO—, wherein R4 is an alkyl and/or alkenyl group having from 7 to 15 carbon atoms; and $R^{1c}$, a group R4CO—NH—R5-, wherein R5 is an alkylene group having 1 to 4 carbon atoms, $R^2$ and $R^3$ are independently selected from the group consisting of co-carboxyalkyl groups ($R^{2a}$, $R^{3a}$) of formula —$(CH_2)_n$—COOM (II), wherein M is $H^+$ or a cation and n is a number from 1 to 10;

ω-hydroxyalkyl groups ($R^{2b}$, $R^{3b}$) of formula —$(CH_2)_n$—OH (III), wherein n is a number from 1 to 10; and groups ($R_{2c}$, $R_{3c}$) of formula —($CH_2CH_2$—$R^6$)$_m$—$R^7$—COOM (IV), wherein M is $H^+$ or a cation, m is a number from 1 to 10, $R^6$ is selected from —O— and —NH— and $R^7$ is an alkylene group having 1 to 4 carbon atoms.

2. The method according to claim 1, wherein the amphoteric surfactant (A) is of formula (Ia), $R^{1a}$—N($CH_2$)$_n$—COOM)$_2$.

3. The method according to claim 1, wherein the amphoteric surfactant (A) is of formula (Ib), $R^4CO$—N(($CH_2$)$_n$—OH)(($CH_2CH_2$—$R^6$)$_m$—$R^7$—COOM).

4. The method according to claim 1, wherein the amphoteric surfactant (A) is of formula (Ic), $R^4CO$—NH—$R^5$—N($CH_2$)$_n$—COOM)—($CH_2CH_2$—$R^6$)$_m$—$R^7$—COOM).

5. The method according to claim 1, wherein the subterranean formation comprises carbonatic rocks.

6. The method according to claim 1, wherein the acid includes HCl.

7. The method according to claim 6, wherein a concentration of the HCl is from 2% to 28% by weight with respect to all components of the aqueous formulation.

8. The method according to claim 1, wherein the acid comprises methanesulfonic acid.

9. The method according to claim 8, wherein the concentration of the methanesulfonic acid is from 1% to 50% by weight with respect to all components of the aqueous formulation.

10. The method according to claim 8, wherein a concentration of the methanesulfonic acid is from 10% to 30% by weight with respect to all components of the aqueous formulation.

11. The method according to claim 1, wherein the aqueous formulation includes a mixture of at least two different acids.

12. The method according to claim 11, wherein the mixture of at least two acids is selected from methanesulfonic acid and HF, methanesulfonic acid and HCl, formic acid and acetic acid, acetic acid and HCl, formic acid and HCl, or HF and HCl.

13. The method according to claim 1, wherein a concentration of the at least one surfactant is from 0.1 to 10% by weight with respect to all components of the aqueous formulation.

14. The method according to claim 1, wherein a concentration of the at least one surfactant is from 0.2 to 2.5% by weight with respect to all components of the aqueous formulation.

15. The method according to claim 1, wherein the aqueous formulation further comprises at least one complexing agent.

16. The method according to claim 15, wherein the complexing agent is selected from the group consisting of nitrilotriacetic acid (NTA), ethylenediaminetetraacetic acid (EDTA), diethylenetriaminepentaacetic acid (DTPA), hydroxyethylethylenediaminetriacetic acid (HEDTA) and methylglycinediacetic acid (MGDA).

17. The method according to claim 15, wherein the complexing agent is methylglycinediacetic acid (MGDA).

18. The method according to claim 1, wherein the aqueous formulation further comprises at least one component selected from the group consisting of polymers for increasing a viscosity, foam formers, foam breakers, oxidizing agents, enzymes, assistants for reducing the a friction, assistants for controlling paraffin precipitations, and biocides.

19. The method according to claim 1, wherein the subterranean formation is at a temperature of from 20° C. to 250° C.

20. The method according to claim 1, wherein
$R^{1a}$: an alkyl and/or alkenyl group having from 10 to 14 carbon atoms
$R^{1b}$: a group $R^4CO$—, wherein $R^4$ is a linear alkyl and/or alkenyl group having from 9 to 13 carbon atoms, and
$R^{1c}$: a group $R^4CO$—NH—$R^5$—, wherein $R^4$ has the meaning as defined above and $R^5$ is a 1,2 ethylene group —$CH_2$—$CH_2$—,
$R^2$ and $R^3$ are selected independently from the group consisting of
$R^{2a}$, $R^{3a}$: ω-carboxyalkyl groups of the general formula —($CH_2$)$_n$—COOM (II), wherein M is H or $Na^+$ or $K^+$, and n is 2,
$R^{2b}$, $R^{3b}$: ω-hydroxyalkyl groups of the general formula —($CH_2$)$_n$—OH (III), n is 2,
$R^{2c}$, $R^{3c}$: groups of the general formula —($CH_2CH_2$—$R^6$)$_m$—$R^7$—COOM (IV), wherein M is H+ or $Na^+$ or $K^+$, m is 1, $R^6$ is selected from —O— and —NH— and $R^7$ is a methylene group —$CH_2$—, and
$R^2$ is selected from $R^{2a}$, $R^{2b}$, and $R^{2c}$ and $R^3$ is selected from $R^{3a}$, $R^{3b}$, and $R^{3c}$ with the proviso that at least one of the groups $R^2$ and $R^3$ comprises a —COOM group.

\* \* \* \* \*